Feb. 25, 1941.    H. KETEL    2,233,135
LANDING GEAR FOR TRUCK TRAILERS
Filed July 22, 1940    2 Sheets-Sheet 1
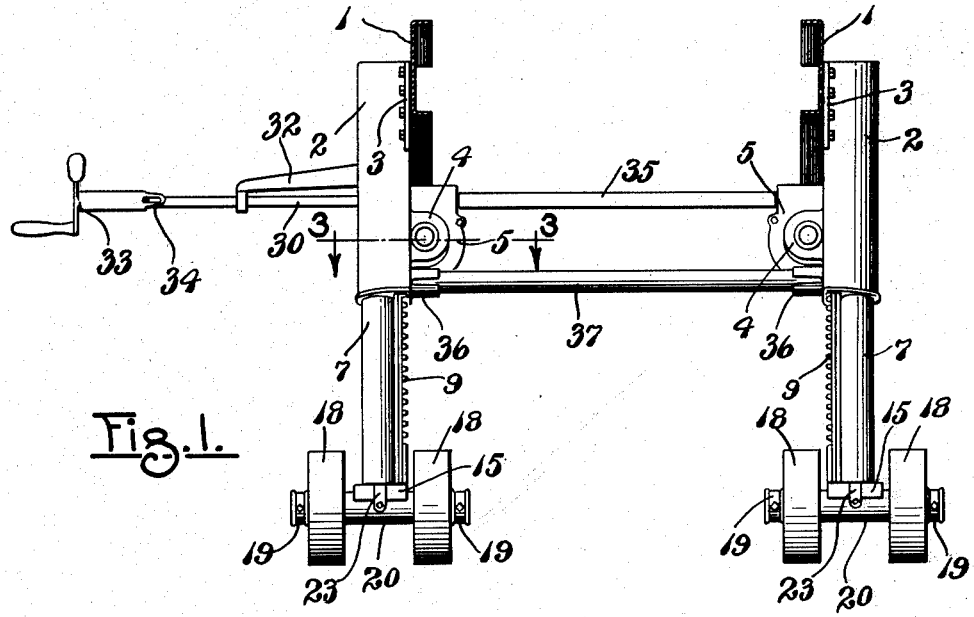
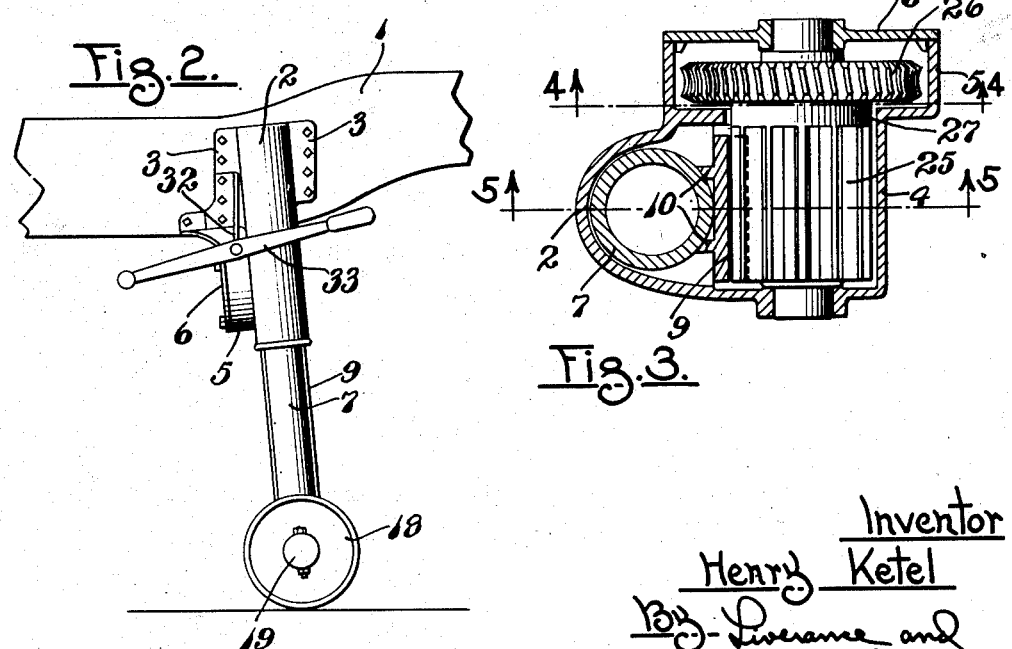
Inventor
Henry Ketel
By Liverance and
Van Antwerp
Attorneys Feb. 25, 1941.    H. KETEL    2,233,135
LANDING GEAR FOR TRUCK TRAILERS
Filed July 22, 1940    2 Sheets-Sheet 2

Inventor
Henry Ketel
By Liverance and Van Antwerp
Attorneys

Patented Feb. 25, 1941

2,233,135

UNITED STATES PATENT OFFICE 2,233,135

LANDING GEAR FOR TRUCK TRAILERS

Henry Ketel, Holland, Mich.

Application July 22, 1940, Serial No. 346,695

5 Claims. (Cl. 254—86)

This invention relates to landing gears for trailers which in use are connected to trucks and supported at their front portions thereby, but which when disconnected from the trucks are held at their front ends in position by landing gears.

Landing gears of the general type to which my invention pertains are mounted upon and carried by the side or chassis frame members of the trailer, and include wheels to bear upon the road or pavement when the landing gear has been extended downwardly and thus support the trailer at its front portion. When the trailer is connected with a truck the wheels are retracted and elevated to an upper position so as not to either engage the road or strike thereagainst when the trailer is being drawn by a truck over the road.

It is a primary object and purpose of the present invention to provide a strong, durable, simple and economical construction of landing gear which may be lowered or retracted as required, from a side of the trailer in a simple expeditious manner.

One feature of my invention is that when the trailer is disconnected from the truck and supported by the landing gear it is held securely in the position to which its front end may be adjusted with respect to the wheels resting upon the road or pavement, and is automatically locked against any danger of the landing gear retracting because of the weight of the load which it sustains. The landing gear may be operated to elevate the front end of the trailer to an upper position such that the truck may be backed to the trailer and readily connected therewith after which the landing gear is retracted; and when the trailer has been drawn to its destination the landing gear is lowered to support the entire weight of the front portion of the trailer and relieve the truck from such weight, whereupon the truck is readily disconnected.

A further feature of the invention resides in operative construction whereby the landing gear may be raised or lowered and the front end of the trailer elevated as much as may be needed by manual operation of a crank and without the exertion of undue force upon such crank such that the operator may readily and relatively easily manually perform the required operations.

Many other objects and purposes and novel constructions and combinations and arrangements of parts for attaining the same will be apparent and understood from the following description taken in connection with the accompanying drawings, in which, Fig. 1 is an elevation of the landing gear attached to the side frame members of the trailer, which are shown fragmentarily in section.

Fig. 2 is a side elevation of the landing gear and of a fragmentary portion of one side of the trailer frame or chassis.

Fig. 3 is a horizontal section substantially on the plane of line 3—3 of Fig. 1.

Like reference characters refer to like parts in the different figures of the drawing.

Figure 4:
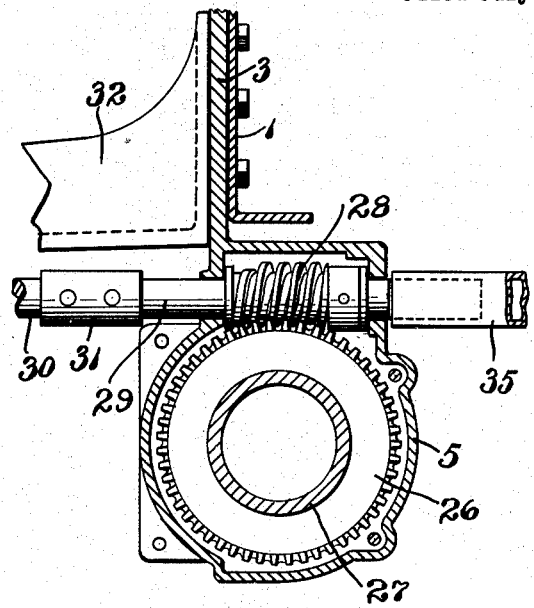
Fig. 4 is a vertical section substantially on the plane of line 4—4 of Fig. 3.

The trailer to which the landing gear is connected may be of any well-known and conventional construction having spaced apart side chassis frame members 1 to the forward portions of which the landing gear is secured. In the construction disclosed, an elongated hollow vertical housing 2 is provided with integral flange plates 3 at its upper end which lie against a chassis frame member 1 of the trailer and are bolted securely thereto. The housing 2 at its inner side underneath the frame member 1 of the trailer to which it is connected has an integral laterally offset housing comprising two sections 4 and 5, the latter being of larger diameter than the former, and having an open side which in practice is closed by plate 6 (Fig. 3).

A cylindrical post 7 is entered into the lower end of each housing 2 and telescopes upwardly therein. At its lower end and at an upper portion therein considerably spaced from the lower end, the housing is provided with bearing surfaces 8 which engage the posts relatively closely and hold them against any tendency for the projected lower portions thereof below the housings to shift laterally in any direction.

Figure 5:
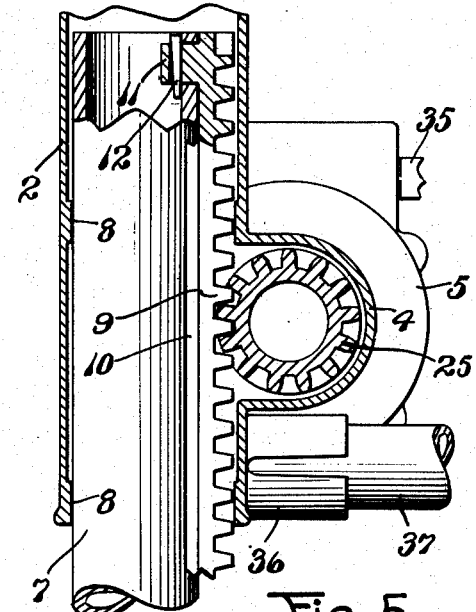
Fig. 5 is a vertical section substantially on the plane of line 5—5 of Fig. 3.
Figure 6:
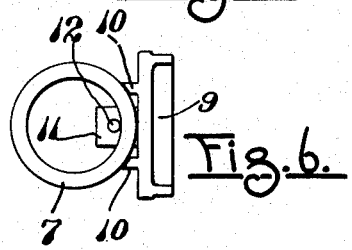
Fig. 6 is a plan view of one of the vertical posts of the landing gear with the rack attached and associated therewith.

At the inner side of each post a rack 9 is mounted extending substantially the full length of the post. The rack, as shown in Fig. 3, is wider than the diameter of the post 7 and at the side adjacent the post is provided with a pair of spaced ribs 10 extending toward and shaped at their free edges to bear against the curved outer cylindrical surface of the post against which it is placed. At the upper end of the post an opening is made through which a lug 11 integral with the rack extends which is secured by a heavy cotter pin 12 driven through a vertical opening in the lug 11 as shown in Fig. 5. At the lower end of the post the rack is connected by a transverse pin 13 headed at both ends, which passes through the post and rack as shown in Fig. 7.

The pin 13 at the lower end of each post also passes through an upwardly extending sleeve 14 (Fig. 7) inserted into the lower end of the post which extends upwardly from an inverted cup 15 of larger diameter and against which the lower ends of the post and rack engage. The cup has a rubber block 16 therein in which there is a central vertical opening.

Figure 8:
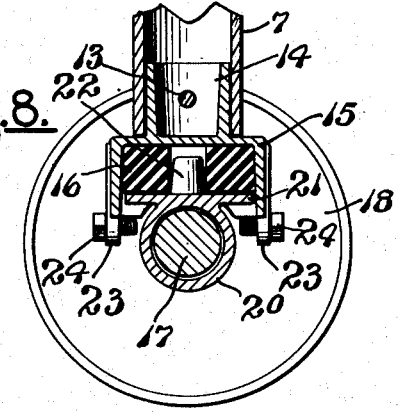
Figure 7:
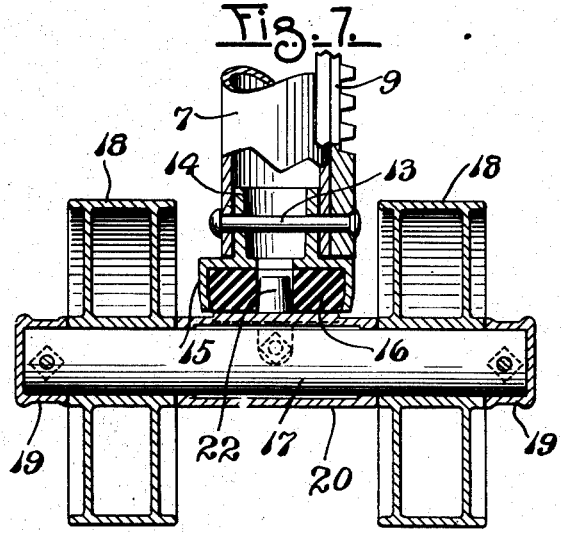
Fig. 7 is a vertical section through the wheel mounting at the lower end of each of the posts of the landing gear, said section being taken in a plane parallel to the axis about which the wheels turn, and, Fig. 8 is a central vertical section at the lower end of a landing gear post, the section being taken at right angles to that shown in Fig. 7.

An axle rod 17 carries two spaced apart wheels 18 which are held on the axle against outward movement by caps 19 covering the ends of the axle and secured thereto, as in Figs. 1 and 7. Between the wheels a sleeve 20 surrounds the axle 17, the upper side thereof being provided with oppositely extending flanges 21 (Fig. 8) making a horizontal surface upon which the lower side of the rubber block 16 rests. A stud or pin 22 cast integrally with and extending upwardly from the upper side of the sleeve 17 enters the central opening in the block 16. The inverted cup 15 at opposite sides is provided with downwardly extending ears 23 through which set screws 24 are threaded, said screws coming underneath the flanges 21. With this construction a cushioning of the road shocks imparted by the wheels is attained by reason of the resilient character of the rubber block 16 and the wheels are permitted a limited though sufficient freedom of movement that they may turn angularly, or one wheel lift higher than the other in passing over an obstruction.

Within the housing sections 4 and 5, a combined pinion 25 and worm gear 26 connected by an integral cylindrical section 27 are mounted in bearings in a side of the housing section 4 and in a plate 6 (Fig. 3). The pinion 25 engages with the rack 9. It is a relatively long pinion so that the connection between it and the wide rack 9 is one capable of sustaining heavy duty.

A worm 28 on a shaft 29 is in mesh with each of the worm gears 26 at the upper part and within each housing 5 (Fig. 4). A laterally extending shaft 30 at one side of the landing gear (Fig. 1) is connected with an end of the adjacent worm shaft 29 by a coupling sleeve 31. The shaft 30 is supported and held in proper horizontal position by a bracket 32 bolted to the side of the chassis frame and extending outwardly as shown in Fig. 1, the outer end of the bracket being provided with a collar or sleeve through which the shaft 30 passes. A crank 33 is connected by a coupling 34 with the outer end of the shaft 30 and may be locked therewith in the position shown in Fig. 1 so that the shaft 30 may be turned by manual operation of the crank to thereby turn the connected worm wheel 26 and raise or lower the post 7 in accordance with the direction in which the shaft 30 is turned. The coupling at 34 is one which permits the crank 33 to be turned to a down position and held suspended in such position so as not to project outwardly with danger of hooking upon other vehicles, trailers or the like when the trailer is being moved.

The two worm shafts 29 are in horizontal alinement and at their inner ends are squared preferably so that an elongated tube or sleeve 35 of a similar cross-section may be placed at its ends over said squared ends of the shafts 29 to connect them and cause both to be operated simultaneously and equally on manual operation of the crank 33 thereby raising or lowering the posts 7 and the attached wheels at their lower ends simultaneously. Immediately below the housing sections 4 sleeves 36 are cast integral with the housings 2 and extend horizontally toward each other between which a bracing rod or tube 37 is placed, the ends thereof being received within said sleeves and secured in any desired manner.

It is apparent that with this construction a manual operation of the crank at 33 will simultaneously raise or lower the landing gear posts 7 and wheels at 18 carried at the lower ends thereof. The design of the worms 28 and the worm or tangent wheels 26 is such that the exertion of relatively small force upon the crank 33 will elevate or lower the posts 7, and when they have reached the road or pavement when lowered the weight of the trailer at its front end may be quite readily lifted without the expenditure of undue force upon the crank 33. The worms 28 and the worm wheels 26 likewise provide an automatic lock in any position at which they are left, thereby maintaining the landing gear in retracted position when the trailer is connected to a truck and also maintaining it in its extended position when the weight at the front end of the trailer is being borne by the landing gear.

The construction is economical to produce. The cylindrical posts 7 and the racks 9 are fabricated independently of each other and easily secured together in permanent relation. The structure is exceptionally simple, strong and durable and capable of sustaining the severe use to which it is subjected in service.

The invention is defined in the appended claims and is to be considered comprehensive of all forms of structure coming within their scope.

I claim:

1. A trailer landing gear comprising, two elongated housings adapted to be permanently connected at their upper ends one to each of the side frame members of a trailer and extending downwardly therefrom, a cylindrical post telescopically received in the lower end of each housing extending upwardly therein, a rack located against the inner side of each post, means connecting the rack at its upper end to its associated post, a member having an upward projection thereon located at the lower end of each post said projection extending into the post, a pin passing through said post, projection and the lower end of the rack permanently securing the parts together, road engaging means mounted upon and carried by said member, and manually operable gearing means connected with said racks for simultaneously and equally raising and lowering said posts in their housings.

2. A trailer landing gear comprising, two elongated vertical housings adapted to be secured at their upper end portions one to each of the side frame members of a trailer and depend therefrom, a cylindrical post telescopically entered into the lower end of each housing, a flat bar rack located against each post at the inner side thereof, said racks having spaced apart ribs extending therefrom and bearing against the curved surfaces of the posts, a lug at the upper end of each rack extending through an opening in the upper end of its associated post, means for securing the lug against detachment from the post, means for permanently securing the rack at its lower end to its post, ground engaging wheel elements connected to the lower ends of the posts, gearing means mounted on each housing engaging one with each rack for moving the posts upwardly or downwardly in their housings, and manually operable means for simultaneously equally operating said gearing means.

3. A trailer landing gear comprising, an elongated housing secured to the frame of a trailer and depending downwardly therefrom, a post mounted for vertically reciprocating movement in said housing, a rack located against a side of said post, a lug at the upper end of the rack extending through an opening in said post, means for securing said lug to said post, ground engaging wheels located at the lower end of said post, means for connecting together the lower end of the rack, the lower end of the post and the wheels, and means engaging said rack for moving said post within said housing.

4. A trailer landing gear comprising, an elongated housing secured to the frame of a trailer and depending downwardly therefrom, a post mounted for reciprocating movement within said housing, two ground engaging wheels at the lower end of said post connected together by an axle, a sleeve covering said axle having a flat horizontal portion at the top side thereof, means connecting said post and sleeve together whereby said wheels will be elevated and lowered with said post, and means to reciprocate said post in said housing.

5. The combination of elements defined in claim 4, combined with a rubber block located between said flat portion of the axle and the bottom of said post to cushion shocks.

HENRY KETEL.